April 15, 1969     G. JAKAB     3,438,600

HOMING SYSTEM FOR AIRCRAFT

Filed May 19, 1966

INVENTOR
GABOR JAKAB

April 15, 1969          G. JAKAB          3,438,600

HOMING SYSTEM FOR AIRCRAFT

Filed May 19, 1966          Sheet 2 of 4

*INVENTOR.*
GABOR JAKAB
BY Dicke & Craig
ATTORNEYS

INVENTOR.
GABOR JAKAB

United States Patent Office 3,438,600
Patented Apr. 15, 1969

3,438,600
HOMING SYSTEM FOR AIRCRAFT
Gabor Jakab, Markdorf, Germany, assignor to Dornier Werke GmbH, Friedrichshafen, Germany
Continuation-in-part of application Ser. No. 501,512, Oct. 22, 1965. This application May 19, 1966, Ser. No. 551,373
Int. Cl. B64c *13/18, 13/20*
U.S. Cl. 244—76
9 Claims

ABSTRACT OF THE DISCLOSURE

This invention describes an adjustable sighting device whose line of sight points towards the touchdown point on the ground at an inclination corresponding to the angle of approach. The line of sight is held at a preselectable constant angle of inclination relative to the geodetic horizontal plane by stabilizing means during all possible flight movements during approach. The azimuth direction of the line of sight is maintained either parallel to the plane of symmetry of the aircraft, or is adjustable to form an angle with respect to the plane of symmetry which angle is required by the mechanics of flight. The adjustable sighting device enables the pilot of the aircraft being landed to directly view the landing field by means of a periscope, if otherwise the pilots vision is obstructed by fuselage parts, heat shields, etc. and portrays the necessary information required to accomplish a safe landing. This information is projected onto an appropriate reflex sighting pane mounted on the windshield of the aircraft so that the pilot does not have to divert his view from the approaching landing field and yet is provided with all necessary information pertaining to the safe landing.

---

The present invention is a continuation-in-part application of my co-pending application Ser. No. 501,512, filed in the United States Patent Office on Oct. 22, 1965.

The present invention relates to homing aids located on board an aircraft for facilitating precision landing under good visibility conditions.

The invention is a further development and improvement of the invention disclosed in U.S. Patent No. 3,190,585.

The capability of using small and limited landing areas is required for numerous operations of fighter planes, interception fighter planes and transport planes as well as of liaison airplanes and short take-off transport planes. For economic or military reasons, landing aids, such as beacons, optical directional beams for marking the glide path, mirrors, etc. are not available, and hence cannot be relied upon to assist in landing operations. Landing under the aforesaid conditions is possible only if the final approach takes place under almost optimal conditions of the mechanics of flight, i.e., if the gliding angle, the angle of pitch and the speed are so adjusted that flattening-out and rolling-out after touchdown is effected within the shortest possible distance.

With the conventional approach of modern airplanes the estimating capability of the pilot is frequently over-taxed, although aiding devices are provided aboard. It is particularly difficult to maintain the correct flying speed since this speed depends on the total weight of the aircraft which depends on the amount of fuel on board, the payload, etc. and which may thus be very different at different times.

It has already been proposed to make the approach according to the optimal angle of incidence since the latter is independent of the given flying weight and therefore constant. The choice of the correct gliding angle, however, depends again on the estimating ability of the pilot. There exists the danger that the necessary correcting maneuvers cause landing speeds which are too high, or cause missing the correct touchdown points.

A gliding angle indication has also been proposed in combination with a line of sight which is rigid relative to the aircraft. Such line of sight can be used in practice only in a limited way because with the always-needed correction of the angle of pitch the line of sight drifts in an undesired manner. Furthermore, there exists the danger, if the angle of incidence is not controlled simultaneously with the aiming operation, that the aircraft is pushed over or stalled.

It is an object of the present invention to provide a homing aid for aircrafts which relieves the pilot of making subjective estimates of the gliding angle during the landing approach and which, at the same time, enables the pilot to supervise and control the flight parameters needed for maintaining a descending course which is optimal with respect to the mechanics of flight, without having to take his eyes from the landing field. The device according to the present invention operates independently of changes of inclination and accelerations.

This object is obtained, according to the present invention, by providing an adjustable sighting device whose line of sight points toward the touchdown point on the ground at an inclination corresponding to the angle of approach, whereby the line of sight is held at a preselectable constant angle of inclination relative to the geodetic horizontal plane by stabilizing means during all possible flight movements during approach whereas the azimuth direction of the line of sight is either parallel to the plane of symmetry of the aircraft or is adjustable at an angle with the plane of symmetry which angle is required by the mechanics of flight. The device according to the present invention enables the pilot to directly view the landing field by means of a periscope, if, otherwise, the pilot's vision is obstructed by fuselage parts, heat shields, etc.

The novel features which are considered characteristic of the present invention are set forth with particularity in the appended claims. The invention itself, however, and additional objects and advantages thereof will best be understood from the following description of embodiments thereof when read in connection with the accompanying drawing, wherein:

Figure 1:
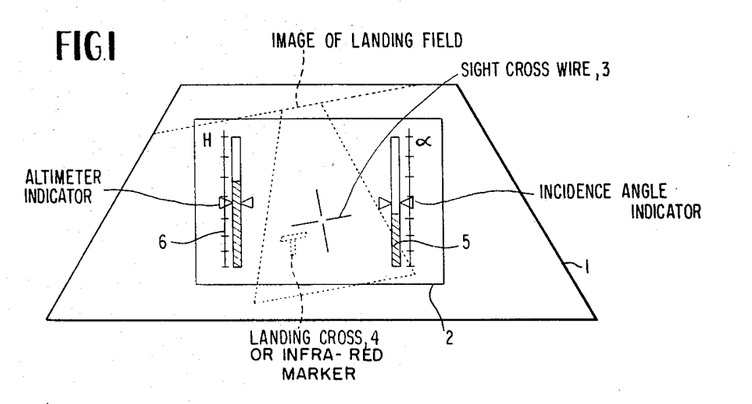
FIGURE 1 shows a landing field as seen by the pilot in a sight apparatus according to the present invention, with sighting data projected into the landing field.

Referring more particularly to FIGURE 1 of the drawing, reference numeral 1 designates therein the contour of a windshield and reference numeral 2 the contour of a reflex sighting pane which is inclined relative to the line of vision of the pilot. An aiming cross wire 3 which constitutes one form of a suitable device for producing an aircraft aiming graticule image and marks the intersection of the line of sight with the landing field which is represented by dotted lines and by a landing cross 4. The line of sight of the aircraft aiming graticule image 3 which is adjustable to a selectable vertical landing approach angle, remains stationary relative to a geodetic coordinate system, independently of changes in the angle of pitch and in the banking of the aircraft. Consequently, if the center of gravity of the aircraft moves downward along the desired glide path, the aiming cross 3 continuously points toward the intersection of the desired glide path with the landing field.

Reference numeral 5 designate the indication appearing on the right side of the sight apparatus and supplying the information concerning the instantaneous angle of incidence. The indication 6 at the left side is derived from a precision altimeter H.

Figure 2:
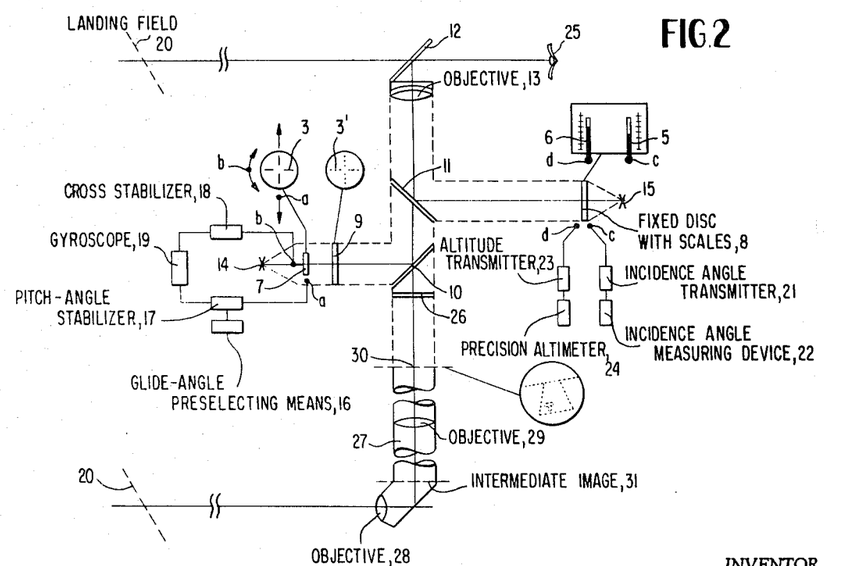
FIGURE 2 is a diagrammatic illustration of the optical and electrical parts of the sighting apparatus according to the present invention.

FIGURE 2 diagrammatically illustrates the fundamental arrangement and operation of the sight apparatus according to the present invention. It has an optical part comprising an aircraft aiming graticule image producing means including a cross wire disk 7 and a scale disk 8, semi-transparent mirrors 9, 10, 11 and 12, and an objective 13. The disks 7 and 8 are lighted by light sources 14 and 15, respectively. The light-path distances between the disks 7 and 8 and the objective 13 are equal and correspond to the focal distance of the objective. In this way the image planes of the disks 7 and 8 are projected into infinity or, after deflection through the semi-transparent reflecting pane 12, are so projected into the eye of the observer, that the indications appear to be located in the plane of the landing field. The disk 7 with the cross wires thereon can be deflected vertically and can also be rotated about its center by conventional actuating means of any construction. The vertical deflection is initially adjusted by a glide-angle preselecting device 16 of any conventional construction and is stabilized by means of an angle of pitch stabilizer 17 also of any conventional construction to which the preselecting means 16 is operatively connected in any appropriate manner, known per se in the prior art. A cross or lateral stabilizer 18 also of any conventional construction assures the position of the cross wire 3 parallel with the horizon. The pitch stabilizer 17 and the lateral or cross stabilizer 18 are controlled in a conventional manner by a gravity erected gyroscope 19. All movements of the element 7 are effective as movements of the image of aiming graticule or cross wire 3 appearing in the landing field 20. The scale disk 8 is rigidly mounted and comprises the scale markings of the angle of incidence indicator 5 and of the altimeter 6 (or such other and/or additional markings as may be desired). The respective indicating means are in a common image plane. The angle of incidence indication is actuated by means of a conventional angle of incidence transmitter 21 which is connected to a conventional measuring instrument 22. The indication of the altimeter is actuated by a conventional altitude transmitter 23 which is connected to a conventional precision altimeter 24. The indications of the devices 5 and 6, viewed by the eye of the pilot, appear in the landing plane 20.

The eye 25 of the pilot is in the correct position when he sees the image of the aiming graticule or cross wire 3 of the disk 7 coinciding with the image 3' of the cross wire 3 on the disk 7, reflected by the semi-mirrored disk 9. This arrangement is primarily necessary for adjusting the device to suit the normal position of the eye of the pilot. With the described beam arrangement, the sighting error is negligible at small deviations of the position of the eye of the pilot from the desired line of sight.

If there is no direct sight connection between the landing field 20 and the pilot's eye 25, a periscope-like auxiliary device 27 may be made effective by opening a flat 26. The optical system of the periscope includes objectives 28 and 29 and is so arranged that the image plane 30 is at the focal distance from the objective 13. The objective 28 of the periscope which produces an intermediate image at 31, is preferably formed by a so-called zoom lens-system of variable focal distance in order to enable changing the image scale of the viewed portion of the landing field 20. For the sake of clarity, collimating lenses, necessary for affecting the illuminating beam path, have not been shown either in the landing sight or in the periscope.

Operation

The homing flight takes place in the following manner:
After the pilot has effected exact course to the touchdown point, he preselects the desired gliding angle by means of the device 16. Shortly before the touchdown point appears in alignment with the image of the aircraft aiming graticule or cross wire 3, the pilot adjusts flight parameters, as angle of incidence, speed, thrust and also the landing flaps, etc., according to the optimal homing flight conditions for the desired gliding angle. From now on the pilot must only maintain constant the angle of incidence and assure with the aid of thrust corrections that the image of the aircraft aiming graticule or cross wire 3 remains in coincidence with the touchdown point. Correction of the lateral or cross position is made possible by observing the rotation of the aiming cross wire without having to take his eye off the landing field. The same is true with other flight supervisory data, for example, altitude, which are projected into the field of vision of the pilot. This renders it possible to initiate the flattening-out operation at the correct moment.

The foregoing example deals with a simplified, schematized case. Depending on the use of the aircraft, variations and additions based on the same principle may be made. For example, a conventional, adjustable drift angle correction of the cross wire 3 and a conventional stabilizing arrangement connected with a directional gyroscope or gyrocompass may be provided which also affect, i.e., control the cross wire disk 7. In addition to or in lieu of the altimeter indication, indication of speed or of another condition which must be supervised may be projected in a similar manner into the field of vision of the pilot. Further, while in the present embodiment of the invention the cross wire disc 7 has been the element of the aircraft aiming graticule image producing optical system which has been stabilized to maintain the line of sight of the aiming graticule or cross wire 3 image at the preselected landing angle of approach, it is believed obvious that other elements of the aiming graticule image producing system could be so stabilized with equivalent results.

In a further development of the instant invention, the sighting device according to this invention may be used as an element of a control system carrying out a semi-automatic landing operation. In this case a signal must be transmitted from the device for preselecting the gliding angle to the flight regulator of customary, conventional construction which adjusts the altitude and thrust parameters according to the preselected optimal gliding angle. A correcting signal is transmitted from an additional device of the sight system to the flight regulator. This correcting signal may be obtained, for example, by providing the sight system with a second, horizontally stabilized cross wire which may be manually adjusted by the pilot to be in line with the touchdown point. The difference between the position of the adjustable cross wire and the cross wire fixed by the preselection of the gliding angle is a measure for the gliding angle correction. When using this arrangement, the pilot must merely preselect the optimal gliding angle and always so readjust the adjustable cross wire that its intersecting point coincides with the touchdown point.

The periscope principle described herein need not be limited to the use of visible light. By using conventional means, infrared images of the landing field may be projected into the image plane 30. In this manner, for example, night landings are possible without special ground aids or assists, other than simple infrared markers which are placed at the touchdown point on the landing field and suffice; under adverse weather conditions to enable the pilot to perform a homing flight. For use in this manner, the sighting means further includes some means for converting the infra-red marker rays into an image within the visible spectrum within the field of vision of the pilot.

The position or vertical gyroscope 19 of FIGURE 2a is again of conventional construction. The rotor 19a of the gyroscope 19 is freely rotatable in the frame 19b which is able to pivot in the bearings 19c and 19d of a second frame 19e. The frame 19e, in its turn, is pivotally mounted at the bearing places 19f and 19g whereby these bearings are fixedly secured at the aircraft. The shafts 19h and 19i of the frames 19b and 19e are disposed at right angle to each other, whereby the shaft 19i is disposed parallel to the aircraft longitudinal axis in the direction of the arrow A. The axis of the gyroscope rotor 19a is thereby disposed perpendicularly to the shafts 19h and 19i which are disposed in the cross plane of the aircraft so that the frames 19b and 19e represent a cardan or universal suspension of the gyroscope rotor 19a. A pendulum stabilization device 19k, which is effective about the axis of shaft 19i of the frame 19e, i.e., about the roll axis of the aircraft is provided on the frame 19e.

Figure 2A:
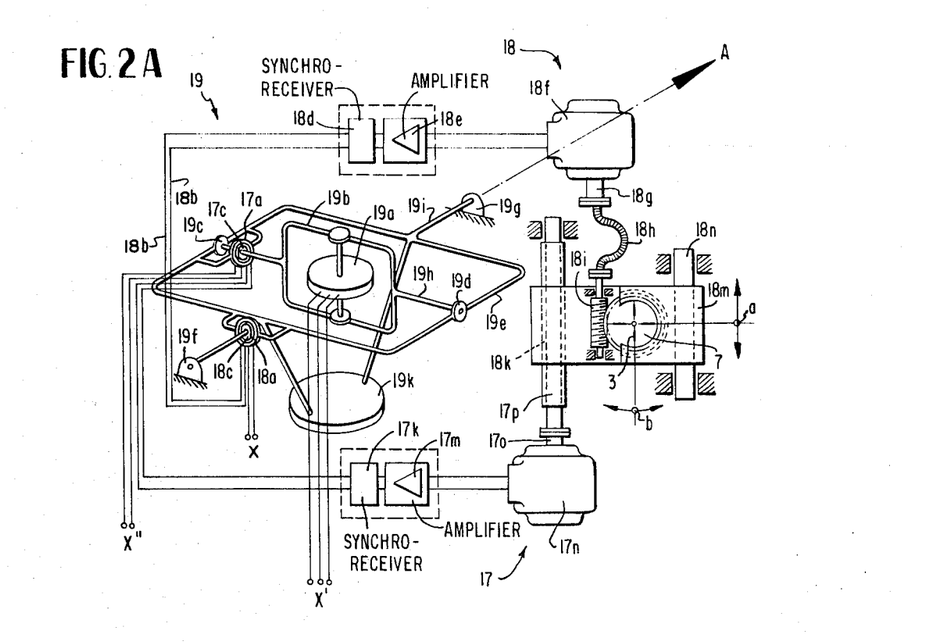
FIGURES 2a and 2b are somewhat schematic perspective and elevational views, respectively, of certain parts of the sighting apparatus of FIGURE 2, illustrating the construction and operation of the pendulum-supported vertical gyroscope, of the pitch stabilizer and of the cross stabilizer in cooperation with the aiming cross wire.

The gyroscope rotor 19a is fed from a conventional current or voltage source $x'$. Two further current sources $x''$ and $x$ are present, by means of which a voltage can be applied to the primary members 17a and 18a of two potentiometers of conventional construction, respectively. The secondary members 17c and 18c are arranged concentrically within the primary members 17a and 18a, respectively, of the potentiometers. The secondary member 17c of the one potentiometer is rigidly connected with the frame 19b or the shaft 19h thereof while the secondary member 18c of the other potentiometer is rigidly connected with the frame 19e or the shaft 19i thereof. The elements designated by reference numeral 17 and appropriate suffix form the pitch stabilizer 17 of the present application. The primary member 17a of the pitch stabilizer potentiometer is connected by way of lines to a synchro-receiver 17k of conventional construction. An amplifier 17m of conventional construction is connected to the output of the synchro-receiver 17k whereby the receiver rotates synchronously with the primary member 17a of the potentiometer in a well known manner. An adjusting motor 17n is connected with the amplifier 17m. The output shaft or drive shaft 17o of the adjusting motor 17n carries a threaded spindle 17p in a non-rotatable manner, i.e., in such a manner as to provide rotation of the spindle 17p in unison with the output shaft 17a. The threaded spindle 17p is adapted to be screwed into a guide or slide carriage receiving the cross wire disk 7 as will be described more fully hereinafter.

The elements designated in FIGURE 2a by reference numeral 18 and appropriate suffix correspond to the cross stabilizer of the sighting apparatus of FIGURE 2.

The primary member 18a of the second potentiometer (for the roll movement) is connected, in its turn, by way of lines to a synchro-receiver 18d, again of conventional construction, which rotates synchronously with the primary member 18a of the second potentiometer corresponding to the applied voltage. An amplifier 18e of conventional construction is also connected to the output of the synchro-receiver 18d. A further adjusting motor 18f is connected by way of lines with the amplifier 18e. The drive shaft 18g of the adjusting motor 18f is coupled with a flexible shaft 18h which is connected with a worm 18i to assure rotation of the worm 18i in unison with rotation of the shaft 18h. The worm 18i is supported at a slide carriage 18m and is in operative connection with a worm gear which is also rotatably supported at the slide carriage 18m, and more particularly at the outer circumference thereof. This slide carriage 18m is displaceably arranged, on the one hand, on a slide rail 18n in the direction of the arrow a (FIG. 2a) and is provided on the other, with a threaded bore 18k into which can be screwed the spindle 17p disposed parallel to the slide rail 18n. The worm gear forms simultaneously the cross wire disk 7 having the aiming cross 3 according to FIGURE 2 of the present application.

The operation of the parts illustrated in FIGURE 2a of the sighting apparatus in accordance with the present invention is as follows:

After the pilot has achieved an accurate course on his landing point, the desired glide angle is selected and, more particularly, for example, by a corresponding adjustment of the position of the vertical gyroscope 19 by means of the stabilization device 19k and the zero adjustment of the potentiometer, corresponding to the glide angle preselecting means 16 of FIGURE 2. Just shortly before the landing point appears at the height of the cross wire 3, the pilot adjusts thereafter his flight magnitudes such as angle of incidence, velocity, thrust, as well as landing flaps, etc., according to the optimum landing flight conditions appertaining to the desired glide angle. The task for the pilot now remains only to maintain constant the angle of incidence $\alpha$ and to assure with the aid of thrust corrections a coincidence of the aiming graticule or cross 3 and the landing point.

The corrections of the cross and pitch inclination, necessary during the further landing approach, will be made visible to the pilot by observing the aiming graticule or sight cross 3. If, for example, a deviation occurs in respect to the cross position, i.e., a roll movement of the aircraft about its longitudinal axis, then the primary member 18a of the one potentiometer carries out a relative rotation with respect to the secondary member 18c. The voltage produced by the primary member 18a is thereby proportional to the angular movement of the primary member with respect to the secondary member. The voltage thus applied to the synchro-receiver (potentiometer) 18d is amplified by the amplifier 18e and therewith a predetermined adjusting pulse is transmitted to the adjusting motor 18f. The cross wire disk 7 is rotated by an amount corresponding to the deviation of the aircraft from its normal cross position in the one or the other direction according to the arrow b by means of the flexible shaft 18h connected with the motor shaft 18g and the worm 18i non-rotatably connected to the shaft 18h. This rotary movement of the cross wire disk 7 corresponds to the magnitude of the angular deviation of the aircraft from its normal flight position about the aircraft longitudinal axis so that the wire cross disk 7 maintains its position corresponding to the normal flight position notwithstanding the roll movement of the aircraft. The aiming cross 3 or the cross wire disk 7 thus maintains its initial position with respect to a coordinate system fixed with respect to the ground (geodetic coordinate system), notwithstanding the roll movement of the aircraft. The second cross wire disk having the aiming cross 3' (FIG. 2) may serve the purpose to make recognizable to the pilot the type and magnitude of the deviation of his craft from the normal flight position or the prescribed flight position. This cross wire disk is fixed with the aircraft and partakes in the roll movements thereof. The pilot now has to carry out a correction by corresponding control movements about the roll axis of the aircraft, and more particularly for such length of time until the cross wire disk 7 again coincides or is in alignment with the cross wire 3', i.e., until the horizontal legs of both cross wires are again parallel to one another. The correction carried out by the pilot about the roll axis of the aircraft causes the generation of a voltage by the relative movement of the potentiometer members 18a and 18b, by means of which the cross wire disk 7 is further retained as a result of the follow-up drive means formed by the members 18d, 18e, 18f, 18h, and 18a in its position with respect to an earth stationary coordinate system (geodetic coordinate system).

The same operation also takes place with a deviation of the aircraft from the pitch inclination, adjusted for the landing approach. With a deviation about the cross axis of the aircraft, a relative movement between the primary and secondary members 17a and 17c of the corresponding potentiometer takes place by means of the vertical gyroscope 19, and a voltage is produced in the output of the potentiometer corresponding to the relative angular movement; the synchro-receiver 17k is accordingly adjusted corresponding to this voltage. The applied voltage imparts to the adjusting motor 17n an adjusting pulse whereby the threaded spindle 17p is set into rotation. The guide carriage 18m is thereby adjusted in the direction of the spindle 17p, i.e., in the direction of the vertical axis of the aircraft and therewith also the cross wire disk 7 (as indicated by the arrow a). Also in the case of a change of the pitch inclination of the aircraft, the cross wire disk 7 is retained in the predetermined position with respect to the geodetic coordinate system by the follow-up drive in the direction of the arrow d, i.e., by rotation. The pilot recognizes the type and magnitude of the deviation of his aircraft by a comparison of the stabilized aiming graticule or cross 3 with the aiming cross 3' fixed with the aircraft. This aiming cross 3' may also be mounted on the windshield of the aircraft whereas the aiming cross 3, as already described, is projected by means of mirrors into the field of vision of the pilot onto the aircraft's windshield. A correction resulting from the deviation from the prescribed desired flight value in relation to a pitch movement of the aircraft can be realized by the pilot exclusively by controlling the propulsion unit output in the sense of an increase or decrease. If a correction is initiated by the pilot during the deviation of the aircraft from the prescribed desired glide path, then the movement caused thereby about the aircraft cross axis with respect to the vertical gyroscope 19 produces a relative movement of the members 17a and 17c of the corresponding potentiometer. The voltage produced thereby brings about by way of the members 17k, 17m, 17n, 17p, and 18m, an adjustment of the cross wire disk 7 in the direction of arrow a corresponding to the magnitude of the movement of the aircraft about its cross axis. The cross wire disk 7 thus also maintains its fixed position with respect to a geodetic coordinate system. The correction of the aircraft is terminated upon coincidence of the position of both aiming crosses 3 and 3'.

Since also the value of the angle of incidence α and of the height of the flight may be projected, by means of mirrors, in the form of a scale 5 and 6 into the windshield, the pilot can carry out the supervision of his flight position and the position of the line of sight to the touchdown point, without having to take his eyes from the landing field.

Figure 2B:
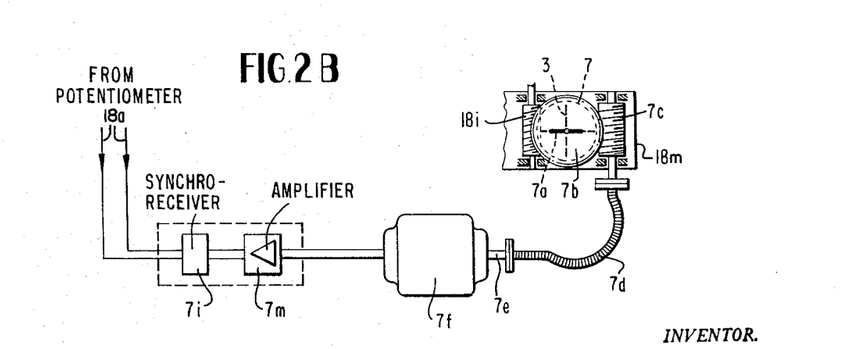

FIGURE 2b of the drawing illustrates a portion of FIGURE 2a of a further embodiment of the sighting apparatus in accordance with the present invention on a somewhat enlarged scale. An aircraft symbol is provided thereby in the place of the aiming cross 3' fixed to the aircraft according to FIGURE 2, which symbol is stabilized in relation to the movements of the aircraft about its roll or longitudinal axis with the aid of a vertical gyroscope 19.

The aircraft symbol 7a consisting of a circularly shaped center mark and two cross legs extending coaxially from the mark toward both sides is provided on a transparent, disk-like pane 7B. This pane overlies the cross disk 7. A worm 7c engages with a worm thread at the outer circumference of the disk 7b. The worm 7c is supported on the slide carriage 18m and is connected by way of a flexible shaft 7d with the motor shaft 7e of an adjusting motor 7f. Electric lines 17b lead from the primary member 18a of the potentiometer for the roll movements of the aircraft to a conventional synchro-receiver 7i whereby an amplifier 7m is connected to the output of the receiver 7i. The amplifier 7m is connected to the adjusting motor 7f. The cross legs of the aircraft symbol 7a are disposed during straight flight of the aircraft, i.e., without any cross inclination or tilting of the aircraft, parallel to the horizontal.

The operation of the embodiment according to FIGURE 2b in conjunction with FIGURE 2a is as follows:

If the aircraft carries out a movement about the roll axis from its normal flight position, then, as already described in connection with FIGURE 2a, an adjusting pulse is transmitted to the adjusting motor 18f which maintains the cross disk 7 in its fixed position to a geodetic coordinate system. An equally large pulse is transmitted therewith by way of the electric line 18a and the members 7i and 7m to the adjusting motor 7f and the disk 7b is rotated by the same angular amount as the cross disk 7 about its axis, however, in the opposite direction. As a result thereof, the disk 7b together with its aircraft symbol 7a rotates synchronously with the aircraft roll movement. An angular deviation results therefrom between the cross legs of the aiming cross 3 and the cross legs of the aircraft symbol 7a which corresponds to the magnitude and direction of roll angle of the aircraft from its normal position. As a result of this stabilization of the disk 7b, the aircraft symbol remains at all times in coincidence with the cross wire disk 7 or with the aiming cross 3 and does not shift during a roll movement of the aircraft. The pilot can thus observe accurately by means of the coincidence the deflection of his aircraft from the normal position without having to compare the position of two indicating means which, spaced from one another, are visible in the field of vision of the pilot corresponding to the deviation from the normal flight position (3 and 7a). The aircraft symbol 7a may thus be considered as fixed with the aircraft; however, the symbol 7a follows by means of the stabilization of the vertical gyroscope 19 the cross disk 7 during a movement of the aircraft about a roll axis, i.e., also the aircraft symbol 7a is fixed with respect to the geodetic coordinate system like the cross disk 7. The same is true with a movement of the aircraft about its cross axis.

With a deviation of the aircraft from its desired glide path or desired landing path, which coincides with the sighting apparatus between the aiming graticule or cross 3 and the target point on the landing strip or runway, the sighting line shifts from the target landing point and thus indicates to the pilot the deviation of his aircraft.

Figure 2C:
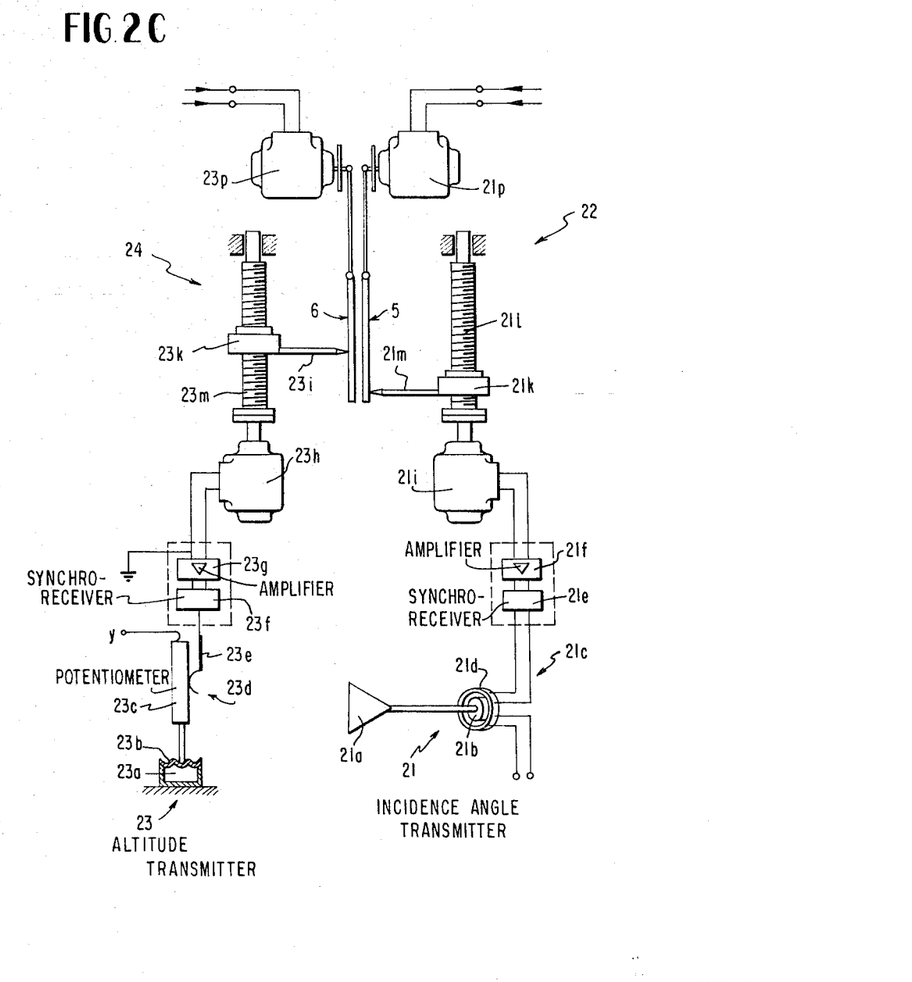
FIGURE 2c is a somewhat schematic elevational view of a further part of the sighting apparatus of FIGURE 2, illustrating the construction and operation of the altitude transmitter and of the incidence angle transmitter.

In FIGURE 2c, further details of the installation according to FIGURE 2 are illustrated. More particularly, the construction of the incidence angle transmitter 21 and of the incidence angle indicator 5 as well as of the altitude transmitter 23 and of the altitude indicator 6 are shown in this figure.

In FIGURE 2c, the same reference numerals are used for the same parts as in FIGURE 2 which, however, are provided with appropriate suffixes for a more accurate and detailed description.

The altitude transmitter generally designated by reference numeral 23 consists in the illustrated embodiment of a pressure measuring box 23a of conventional construction having a diaphragm cover 23b which adjusts itself corresponding to the prevailing air pressure. The primary member 23c of a potentiometer generally designated by reference numeral 23d is connected with the diaphragm cover 23b. The potentiometer 23d is fed from a current source y whereby the secondary member 23e of the potentiometer 23d is connected with a conventional synchro-receiver 23f, which carries out a synchronous movement together with the primary member 23c of the potentiometer 23d when, as a result of a movement of the primary member 23c of the potentiometer 23d with respect to the secondary member 23e a voltage is applied thereto corresponding to the magnitude of the adjusting movement. This voltage is amplified by an amplifier 23g and a corresponding adjusting pulse is transmitted to the adjusting motor 23h connected to the amplifier 23g. The adjusting motor 23h rotates about a predetermined amount corresponding to the adjusting pulse and brings about an adjustment of the altimeter indicator 23i at the threaded sleeve 23k on the spindle 23m. With an opposite adjustment of the potentiometer, the operation takes place in the reverse sense. The altitude of the aircraft is indicated on the altitude measuring scale 6 and is projected by means of mirrors corresponding to mirrors 11 and 12 of FIGURE 2 into the field of vision of the pilot into the windshield of the aircraft.

The incidence angle transmitter and indicator generally designated by reference numerals 21 and 22, respectively, comprise an anemoscope or weather vane 21a which is combined with the primary member 21b of a potentiometer 21c. The secondary member 21d of the potentiometer 21c is thereby arranged fixedly and is in operative connection by way of feed lines with the conventional synchro-receiver 21e of the type already described above. During a corresponding relative movement of the potentiometer members 21b and 21d with respect to each other, a voltage is produced by way of amplifier 21f and an adjusting pulse is transmitted to the motor 21i. The threaded sleeve 21k on the spindle 21l together with its incidence angle indicator 21m thereby undergoes an adjustment. The indication on the scale 5 is also projected by means of the mirrors 11 and 12 of the sighting apparatus into the field of vision of the pilot onto the windshield.

The adjustment of the scales 5 and 6 to the corresponding desired values necessary for the landing approach may be realized by means of the adjusting motors 23p and 21p, respectively.

Figures 2D, 2E:
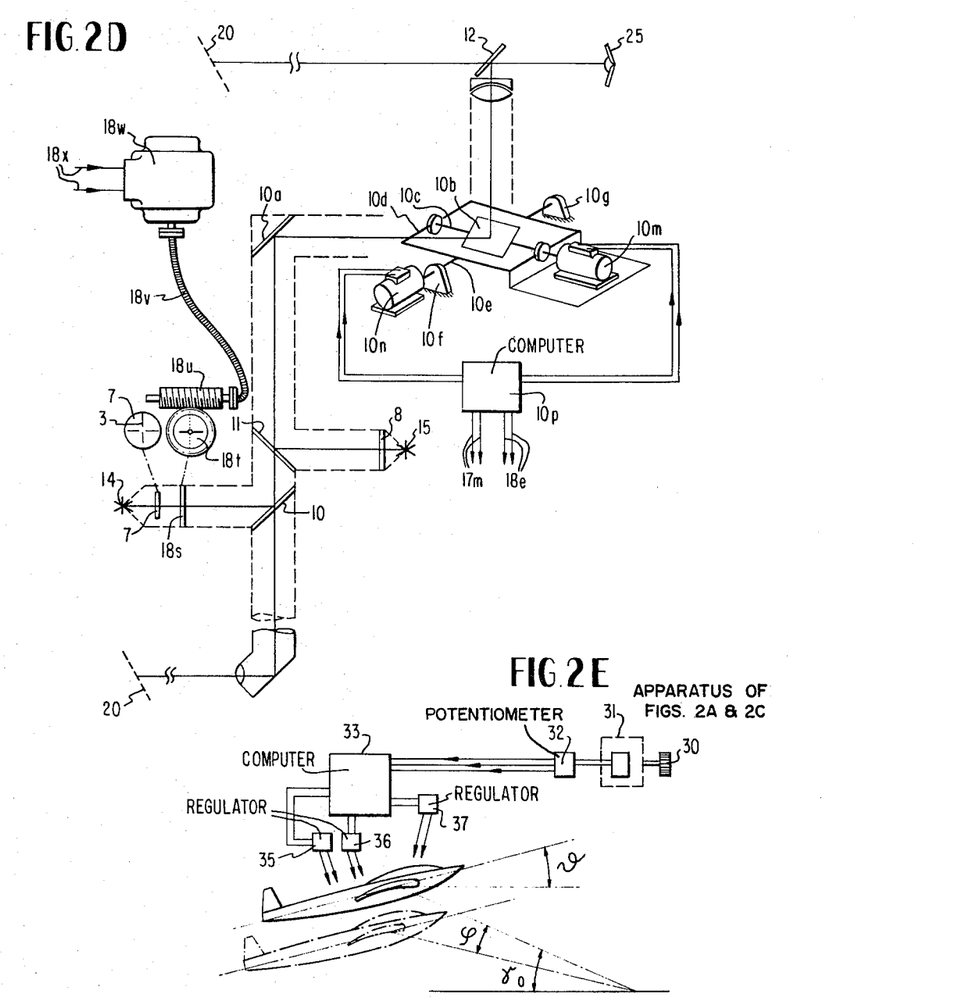
FIGURE 2d is a somewhat schematic perspective view of a modified embodiment of the sighting apparatus illustrated in FIGURE 2, in which a reflector of the optical part of the sighting apparatus, actuated by the pendulum-supported vertical gyroscope, is provided in the place of the adjustment of the cross wire disk.
FIGURE 2e is a schematic sighting apparatus of the present invention in combination with a flight control installation for carrying out semi-automatic landing flights.

A further embodiment of the sighting apparatus in accordance with the present invention is illustrated in FIGURE 2d and more particularly of the part of the sighting apparatus by means of which is realized the adjustment and indication of the cross and pitch inclination of the aircraft according to FIGURES 2 and 2a. The cross wire disk 7 together with the aiming graticule or cross 3 is thereby securely and rigidly connected to the sighting apparatus and the image thereof is projected by means of mirrors corresponding to mirrors 10 and 12 of FIGURE 2 into the field of vision of the pilot onto the windshield of the aircraft. In contradistinction to FIGURES 2 and 2a, in this embodiment two further deflecting mirrors 10a and 10b are interposed into the path of the rays of the optical installation, of which one is also rigidly installed whereas the second mirror is retained in a cardan or universal joint. The adjusting motors thereby act on the cardan joint carrying the mirror 10b as follows:

The deflecting mirror 10b is pivotally arranged about a shaft 10c in a frame 10d of the universal joint in relation to its shaft 10c parallel to the aircraft cross axis. The frame 10d, in its turn, is pivotally supported by means of a shaft 10e in the bearings 10f and 10g fixed with the aircraft, whereby the shaft 10e is provided parallel to the longitudinal axis of the aircraft. The shaft 10c is coupled with the drive shaft of an adjusting motor 10m which is secured at the frame 10d. The shaft 10e of the cardan joint is connected with the drive shaft of a second adjusting motor 10n whereby both adjusting motors 10m and 10n are connected with a computer apparatus 10p by means of corresponding current supply or feed lines. This computer 10p is operatively connected by way of corresponding electric lines with the amplifier 17m and 18e of the corresponding potentiometers according to FIGURE 2a and therewith with the vertical gyroscope 19.

*Operation*

The operation of this embodiment is as follows:
The aiming cross 3 of the cross wire disk 7 is illuminated by a lamp 14 and is reflected by way of the mirrors 10 and 10a onto the mirror 10b. In case of a roll movement of the aircraft, an adjusting pulse is transmitted to the adjusting motor 10n by way of the voltage building up at the respective potentiometer together with a superimposed influence by the computer 10p and therewith the frame 10d together or in unison with the mirror 10b is pivoted about the shaft 10e by an amount which corresponds to the amount of the angular deviation of the aircraft from its normal flight position about the longitudinal axis. The direction of pivot movement of the frame 10d is thereby such that the mirror 10b, notwithstanding the roll movement of the aircraft, maintains a fixed position with respect to a geodetic coordinate system. The same operation repeats itself with a movement of the aircraft from its position about the aircraft cross axis. In this case, an amplifier pulse is transmitted to the adjusting motor 10m from the voltage building up by means of the respective potentiometer, and the mirror 10b pivots about its shaft 10c. Also in this case the adjustment of the mirror 10b corresponds to the angular amount of the deviation of the aircraft from its normal flight position about its cross axis so that the mirror 10b remains fixed with respect to the aforementioned geodetic coordinate system. The aiming cross 3 is reflected by the mirror 10b through the objective into the mirror 12 which may represent the windshield or a part of the windshield pane. This reflector 12 is of the beam-splitter type so that the pilot's eye can recognize on the mirror 12 the stabilized aiming graticule or cross 3 and simultaneously the landing field 20. The altitude indicator 6 and the glide angle indicator 5 are also projected into the windshield by means of the mirror 11. Also, both of these installations 5 and 6 are stabilized by the vertical gyroscope 19 and the mirror 10b both about the aircraft longitudinal axis as well as about the aircraft cross axis so that both the aiming graticule or cross 3 as also the indicators 5 and 6 remain in the same position to each other and may thus be supervised together by the pilot also in case of deviation of the aircraft from its normal position.

For purposes of the supervision of the deviation of the aircraft from its normal flight position about the roll axis, a further disk 18s with an aircraft symbol 18t is inserted into the path of the light rays of the optical installation. The disk 18s is thereby in coincidence or alignment with the cross disk 7. The aircraft symbol 18t is also composed in this case of a circularly shaped mark and two cross legs extending coaxially from this mark. The disk 18s is provided along its outer circumference with a worm thread with which engages a worm 18u whereby this worm is connected by way of a flexible shaft 18v with an adjusting motor 18w. The adjusting motor 18w is connected by way of electric lines 18x with the amplifier 18e of the potentiometer 18a and 18c according to FIGURE 2a.

This installation 18s–18x serves to project for the pilot by means of mirrors into the windshield an aircraft symbol 18t stabilized as to rolling movements in conjunction with the aiming graticule or cross 3 in order to make recognizable to the pilot the possibility of the type and manner of deviation of the aircraft from normal flight position. The disk 18s together with the aircraft symbol 18t is rotated by the same angular amount which the aircraft carries out during its deviation from its normal position about the roll axis so that this symbol can be regarded as fixed with the aircraft. With an adjusting movement of the aircraft, the cross legs of the aircraft symbol will thus assume an inclined position with respect to the cross legs of the aiming graticule or cross 3 and the pilot can recognize the magnitude of the angular deviation and can initiate a corresponding correction of his flight position for such length of time until the cross legs of the aiming cross 3 are again brought into alignment with the cross legs of the aircraft 18t.

The sighting apparatus according to the present invention in conjunction with an aircraft position control apparatus is schematically illustrated in FIGURE 2E.

In this figure, reference numeral 30 designates an adjusting screw to be actuated by the pilot, and reference numeral 31 the sighting apparatus in accordance with the present invention. Reference numeral 32 designates a selecting mechanism for the preselection of the landing flight path or glide path with the angle $\gamma_o$ or the $\gamma$-angle correction. This mechanism 32 may be constituted, for example, by a conventional potentiometer. The potentiometer is connected with a conventional computer 33 which in its turn is operatively connected with the regulator 35 for the regulation of the propulsion drive unit thrust and with the regulator 36 for the pitch angle $\vartheta$ as well as with the regulator 37 for the regulation of the deviation of the aircraft from the desired flight path with the angle $\psi$. The regulators 35, 36, and 37 which may all be of conventional construction are connected with corresponding control devices of the aircraft in any conventional manner, well known per se and therefore not described in detail herein.

In the illustrated embodiment according to FIGURE 2e the landing flight is to be realized semi-automatically with the aid of the regulators and the computer. The stabilized aiming graticule or cross 3 in conjunction with the adjustable aiming cross 3' fixed with the aircraft and the touch-down point on the runway serve for this purpose as reference for the deviation of the aircraft from the intended flight path. After adjustment of the sighting apparatus of the present invention according to FIGURES 2 and 2a to 2d to the optimum landing approach values, the pilot has the task to keep the two aiming crosses 3 and 3' in alignment with the target landing point on the landing strip or runway. In case of a deviation of the aircraft from its optimum prescribed values, the pilot with the aid of the sighting apparatus may recognize on his windshield the magnitude of the deviation by means of the marks 3 and 3' in conjunction with the target landing point on the runway. For example, with a deviation of the optimum landing approach path, no coincidence of the aiming crosses 3 and 3' and of the target landing point exist any longer. The pilot initiates the correction of the landing flight or approach in that he acts by means of the adjusting screw 30 on the aiming cross 3' fixed with the aircraft which is indicated in this figure by reference numeral 31 representing the apparatus of FIGURE 2a in conjunction with FIGURE 2c and brings the aiming cross 3' into alignment with the image of the aircraft aiming graticule or cross 3. This follow-up movement is transmitted by the adjusting screw 30 by way of the sighting apparatus to a member of the potentiometer 32 and is transformed by the potentiometer 32 into a voltage corresponding to the angular adjustment of the potentiometer member and is supplied to the computer 33 by way of conventional intermediate electrical elements not illustrated. The voltage is converted in the computer 33 in a known manner into control commands to the regulators 35, 36, and 37 and thus is transmitted to the control members or devices of the aircraft. The regulators 35, 36, and 37, in their turn, influence the control members of the aircraft, for example, for the propulsion unit thrust, the pitch inclination, and the maintenance of the glide path. The regulators thus bring about in a known manner the adjustment of the aircraft from the deviation position into the optimum flight position for the landing approach. The pilot thus only has to take care for an alignment of the marks 3 and 3' by readjustment by means of the screw 30 whereas the control actuations necessary for the correction are initiated and carried out by the regulating installation of the aircraft or flight position. Thus, the pilot is relieved of a number of controls to be supervised and actuated, and the landing approach can be carried out very accurately according to optimum landing approach values without subjective judgment by the pilot.

The invention is applicable to various types of aircraft. It can be used in connection with high-speed aircraft, landing at a very flat angle, as well as in connection with short take-off aircraft and vertical take-off aircraft operating at a steep approach angle. With the last-mentioned aircraft, the sighted point of the landing field may be held in the line of sight up to touchdown because there may not be a flattening out operation.

The present invention can also be used in connection with manned spacecrafts which perform the landing phase in a glide, possibly with effecting the glide angle by jet action or aerodynamic means connected to an aerofoil. In this case the supplemental telescope-like arrangement is of particular advantage because for aerodynamic reasons or because of heat shielding the pilot's compartment usually permits only a very small field of vision.

The homing system according to the invention can be arranged to selectively serve as sighting device for military use, for example, as bomb-sight, sight for weapons aboard the aircraft, and the like. In this case, the necessary supplemental arrangement would be added to the electrical and optical part of the system according to the invention.

I claim:

1. A homing device for aircraft comprising sighting means supported on the aircraft and including a single adjustable stabilized aircraft aiming graticule image producing means whose line of sight extends to the touchdown point on the ground at a preselectable angle of inclination corresponding to the desired landing approach angle, stabilizing means operatively connected with said aircraft aiming graticule image producing means for maintaining the line of sight during all flight movements of a landing approach in a manner such that the preselectable angle of inclination with respect to the geodetic horizontal plane is maintained constant at the desired landing approach angle and for maintaining the azimuth direction of the line of sight at a predetermined position relative to the plane of symmetry of the aircraft, said aircraft aiming graticule image producing means comprising an aiming cross, and said stabilizing means including gyroscope means having first and second means for producing voltages proportional to the deviation from a respective pitch and roll angle of the aircraft, adjustable means operatively connecting said first and second means with said aiming cross to maintain the latter at a predetermined fixed position with respect to a geodetic coordinate system, an aircraft symbol superimposed on said aiming cross, and means operatively connected with one of said first and second means and to said aircraft symbol for rotating said aircraft symbol in a direction proportional to but opposite to the direction of rotation of said aiming cross as a result of voltages produced in said gyroscope means about the roll axis of the aircraft.

2. A homing device according to claim 1, further comprising means for projecting into the line of sight of the pilot within said sighting apparatus information concerning altitude and incidence angle including a pressure-responsive means, and means operatively connected with said pressure responsive means for projecting the information into the line of sight of the pilot concerning the altitude, weather vane means, and means operatively connected with said weather vane means for projecting the incidence angle information into the line of sight of the pilot within said sighting means.

3. A homing device for aircraft comprising sighting means supported on the aircraft and including a single adjustable stabilized aircraft aiming graticule image producing means whose line of sight extends to the touchdown point on the ground at a preselectable angle of inclination corresponding to a desired landing approach angle, stabilizing means operatively connected with the aircraft aiming graticule image producing means for maintaining the line of sight during all flight movements of a landing approach in a manner such that the preselectable angle of inclination with respect to the geodetic horizontal plane is maintained constant at the desired landing approach angle and for maintaining the azimuth direction of the line of sight at a predetermined position relative to the plane of symmetry of the aircraft, said aircraft aiming graticule image producing means comprising a plurality of reflecting mirrors, means for pivotally supporting one of said mirrors about two orthogonal axes, a first member containing an aiming mark, a second member containing an aircraft symbol, means including at least said one mirror for projecting said aiming mark and said aircraft symbol into the line of sight of the pilot within said sighting means, and wherein said stabilizing means includes gyroscope means producing voltages proportional to deviations of the aircraft from predetermined roll and pitch angles, means operatively controlled by the voltages produced by said gyroscope means for stabilizing at least said one mirror to maintain the line of sight of the aiming mark and said aircraft symbol at the desired landing approach angle, and means operatively connected between said gyroscope means and said second member for adjusting said aircraft symbol in a predetermined manner in accordance with the voltages produced by said gyroscope means.

4. A homing device for aircraft comprising sighting means supported on the aircraft and including a single adjustable stabilized aircraft aiming graticule image producing means whose line of sight extends to the touchdown point on the ground at a preselectable angle of inclination corresponding to the desired landing approach angle, stabilizing means operatively connected with said aircraft aiming graticule image producing means for maintaining the line of sight during all flight movements of a landing approach in a manner such that the preselectable angle of inclination with respect to the geodetic horizontal plane is maintained constant at the desired landing approach angle and for maintaining the azimuth direction of the line of sight at a predetermined position relative to the plane of symmetry of the aircraft, computer means, regulator means for regulating the thrust, the pitch angle and for maintaining the preselected glide path, respectively, said regulator means being operatively connected with and controlled by said computer means, said stabilizing means including gyroscope means producing voltage proportional to the deviations from predetermined pitch and roll angles, and manually actuatable means operatively connected with parts of the gyroscope means in such a manner that readjustment of said manually actuatable means produces the necessary correcting voltages that are supplied to the computer means to automatically produce the desired correction of the aircraft as indicated by said sighting means.

5. A homing device for aircrafts, comprising airborne sighting means including a single adjustable stabilized aircraft aiming graticule image producing means whose line of sight extends to the touch-down point on the ground at a preselected angle of inclination corresponding to the desired landing approach angle, and stabilizing means operatively connected with said aircraft aiming graticule image producing means for maintaining the line of sight under all flight movements of a landing approach in a manner such that the preselected angle of inclination with respect to the geodetic horizontal plane is maintained constant at said desired landing approach angle and for maintaining the azimuth direction of the line of sight at a predetermined position relative to the plane of symmetry of the aircraft, and a control system for enabling semiautomatic landing, said control system including flight regulator means having means for controlling the attitude and thrust for regulating the gliding angle, means including a horizontally stabilized resettable sight mark adjustable to be aligned with the touchdown point for sensing deviations of the gliding angle from the desired gliding angle, and connecting means operatively connecting said flight regulator means with said sight mark for actuating said regulator means in response to said deviation.

6. A homing system for aircrafts according to claim 5, further comprising means for optically representing the landing field, means for optically representing the line of sight in the optically represented landing field, means for indicating flight-mechanically desired flight supervising data, and means for optically projecting the indications of said last mentioned means into the optically represented landing field.

7. A homing system for aircrafts according to claim 6, further comprising means for projecting into optical superposition said sight mark and the indications of the flight-mechanically desired flight supervising data and into the field of view of the pilot, with the image plane located substantially at the distance of the landing field.

8. A homing device for aircrafts according to claim 7, wherein said sight mark is formed by a cross wire rotatable around the center of the cross wire.

9. A homing device for aircrafts according to claim 8, further comprising means responsive to banking of the aircraft and operatively connected to said sight mark for rotating said mark.

References Cited
UNITED STATES PATENTS

| | | | |
|---|---|---|---|
| 3,339,203 | 8/1967 | Curry et al. | 343—108 |
| 2,448,023 | 8/1948 | Folland | 343—108 |
| 2,537,996 | 1/1951 | Hankes | 88—24 |
| 2,945,648 | 7/1960 | Oplinger et al. | 244—77 |
| 3,005,185 | 10/1961 | Cumming et al. | 340—27 |
| 3,128,623 | 4/1964 | Gold | 73—178 |
| 3,136,999 | 6/1964 | Schreffles | 343—108 |
| 3,190,588 | 6/1965 | Busch et al. | 244—75 |
| 3,237,194 | 2/1966 | Curry et al. | 343—108 |

ANDREW H. FARRELL, *Primary Examiner.*

U.S. Cl. X.R.

88—1; 343—108